United States Patent
Castellanos et al.

(10) Patent No.: US 10,511,481 B1
(45) Date of Patent: Dec. 17, 2019

(54) OPTIMIZING APPLICATION CONFIGURATIONS IN A PROVIDER NETWORK

(71) Applicant: Amazon Technologies, Inc., Seattle, WA (US)

(72) Inventors: Lucia Castellanos, Palo Alto, CA (US); Jordan Brest, Redwood City, CA (US); Varvara Nasonova, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 617 days.

(21) Appl. No.: 14/970,534

(22) Filed: Dec. 15, 2015

(51) Int. Cl.
G06F 8/60 (2018.01)
H04L 12/24 (2006.01)

(52) U.S. Cl.
CPC ............ H04L 41/0823 (2013.01); G06F 8/60 (2013.01)

(58) Field of Classification Search
CPC ............................... H04L 41/0823; G06F 8/60
USPC ........................................................ 709/220
See application file for complete search history.

(56) References Cited

U.S. PATENT DOCUMENTS

| | | | |
|---|---|---|---|
| 6,110,214 A | 8/2000 | Klimasauskas | |
| 7,302,256 B1* | 11/2007 | O'Hara, Jr. | ......... H04W 40/246 370/329 |
| 7,756,989 B2 | 7/2010 | Goldszmidt et al. | |
| 7,757,214 B1* | 7/2010 | Palczak | ................. G06F 9/5083 709/223 |
| 8,095,486 B2 | 1/2012 | Chen et al. | |
| 9,014,155 B2* | 4/2015 | Gupta | .................... H04W 8/26 370/338 |
| 9,215,142 B1* | 12/2015 | Herold | .................. H04L 41/084 |
| 9,356,883 B1* | 5/2016 | Borthakur | ........... H04L 41/5025 |
| 9,379,995 B2* | 6/2016 | Shankari | ................ H04L 47/70 |
| 9,406,023 B2* | 8/2016 | Bogojeska | ............... G06N 5/04 |
| 9,712,535 B1* | 7/2017 | Rossman | ............ H04L 63/1433 |
| 2003/0125023 A1* | 7/2003 | Fishler | .................... H04L 67/04 455/426.1 |
| 2004/0117624 A1* | 6/2004 | Brandt | ................ H04L 63/1408 713/166 |
| 2006/0112073 A1* | 5/2006 | Jensen | .................... G06F 9/451 |
| 2009/0167739 A1* | 7/2009 | Tsubata | ................ G09G 3/3659 345/208 |
| 2010/0049637 A1* | 2/2010 | Laventman | ............ G06Q 10/06 705/30 |

(Continued)

*Primary Examiner* — David R Lazaro
*Assistant Examiner* — Berhanu Shitayewoldetadik
(74) *Attorney, Agent, or Firm* — Robert C. Kowert; Kowert, Hood, Munyon, Rankin & Goetzel, P.C.

(57) ABSTRACT

Methods, systems, and computer-readable media for optimizing application configurations in a provider network are disclosed. An application description is determined that comprises one or more resource utilization characteristics of an application. Automated analysis is performed of a plurality of potential configurations for the application based at least in part on the application description. The automated analysis comprises scoring at least a portion of the potential configurations based at least in part on a scoring function. A recommended configuration for the application is determined based at least in part on the automated analysis. The recommended configuration comprises a type and number of computing resources in a multi-tenant provider network.

20 Claims, 8 Drawing Sheets

(56) References Cited

U.S. PATENT DOCUMENTS

| | | | | |
|---|---|---|---|---|
| 2010/0110925 A1* | 5/2010 | Wu | | H04L 41/044 370/252 |
| 2011/0213655 A1* | 9/2011 | Henkin | | G06Q 30/00 705/14.49 |
| 2013/0007272 A1* | 1/2013 | Breitgand | | G06F 9/5077 709/224 |
| 2013/0031037 A1* | 1/2013 | Brandt | | H04L 63/1408 706/12 |
| 2013/0152047 A1* | 6/2013 | Moorthi | | G06F 11/368 717/124 |
| 2014/0007093 A1* | 1/2014 | Deshpande | | G06F 9/45533 718/1 |
| 2014/0019407 A1* | 1/2014 | Wong | | G06F 16/21 707/609 |
| 2014/0046965 A1* | 2/2014 | Tian | | G06F 16/24578 707/749 |
| 2014/0149591 A1* | 5/2014 | Bhattacharya | | H04L 67/1097 709/226 |
| 2014/0181297 A1* | 6/2014 | Nakatsugawa | | H04L 43/0876 709/224 |
| 2014/0229607 A1* | 8/2014 | Jung | | H04L 43/0876 709/224 |
| 2014/0280961 A1* | 9/2014 | Martinez | | H04L 41/5054 709/226 |
| 2015/0149611 A1* | 5/2015 | Lissack | | H04L 43/0817 709/224 |
| 2015/0187069 A1* | 7/2015 | Simanovsky | | G01V 5/0008 382/131 |
| 2015/0199112 A1* | 7/2015 | Van Ryswyk | | G06F 3/0481 715/762 |
| 2015/0317606 A1* | 11/2015 | Bubna | | G06Q 10/1053 705/321 |
| 2016/0036722 A1* | 2/2016 | Obrecht | | G06F 9/50 709/226 |
| 2016/0094477 A1* | 3/2016 | Bai | | H04L 47/786 709/226 |
| 2016/0261711 A1* | 9/2016 | Blum | | H04L 47/783 |

* cited by examiner

OPTIMIZING APPLICATION CONFIGURATIONS IN A PROVIDER NETWORK

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers.

As the scale and scope of distributed systems have increased, the tasks of provisioning, administering, and managing the resources have become increasingly complicated. A distributed system referred to as a provider network may offer, to various customers, access to computing resources and services implemented using the distributed system. When customers access such resources remotely, the resources may be said to reside "in the cloud" and may represent cloud computing resources. For example, the provider network may permit customers to execute programs using virtual compute instances that are implemented using cloud computing resources.

Figure 1:
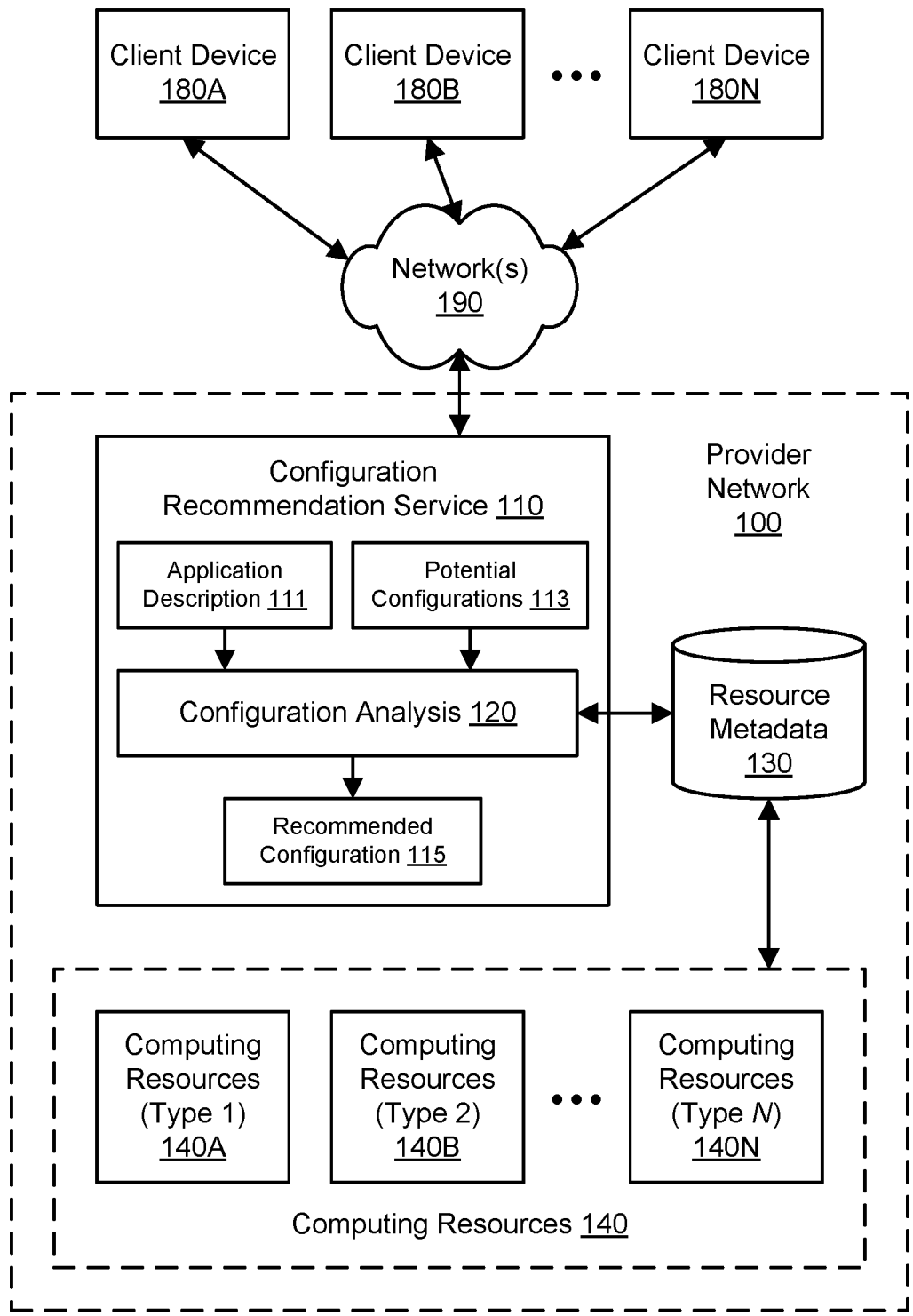
FIG. 1 illustrates an example system environment for optimizing application configurations in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for optimizing application configurations in a provider network are described. Using the techniques described herein, potential configurations of an application in a multi-tenant provider network may be subjected to automated analysis, and a recommended configuration may be selected for the application. A configuration may be recommended for a new and undeployed application, an application that is already deployed in the provider network, or an application that has been deployed in an external environment. Resource usage characteristics (including computational characteristics) for an application may be determined based on input from a user and/or from performance monitoring of an existing deployment. The resource usage characteristics may relate to anticipated or estimated processor usage, memory usage, storage usage, network usage, and so on. Each of a set of potential configurations may represent a type and number of resources in the provider network, e.g., the instance type and number of virtual compute instances. Automated analysis may be performed to score at least some of the potential configurations based on a scoring function. The scoring function may include elements for cost, performance, and/or successful execution. The automated analysis may include nearest neighbor analysis, linear regression analysis, neural network analysis, multi-arm bandit analysis, other suitable types of analysis, and/or any suitable combination thereof. A recommended configuration may be selected from among the potential configurations based on the scores for the potential configurations. With approval by a client associated with the application, the application may be deployed in the provider network using the type and number of resources in the recommended configuration. In this manner, the deployment of applications in a provider network with various types of resources may be optimized automatically and/or programmatically.

FIG. 1 illustrates an example system environment for optimizing application configurations in a provider network, according to one embodiment. Clients of a multi-tenant provider network 100 may use computing devices such as client devices 180A-180N to access a configuration recommendation service 110 and other resources offered by the provider network. The provider network may offer access to resources and services, such as the configuration recommendation service 110 and associated computing resources 140, using multi-tenancy. The computing resources 140 may include different types of resources, such as computing resources 140A of a first type and computing resources 140B of a second type through computing resources 140N of an Nth type. Any suitable types of computing resources 140 may be provided by the provider network 100. For example, the computing resources 140 may include virtual compute instances of various instance types, physical compute instances of various instance types, storage instances for various types of storage subsystems (e.g., block storage instances, NoSQL database instances, SQL database instances, and various types of virtualized storage resources), and so on. In the example shown in FIG. 1, the resources 140A-140N may represent different types of virtual compute instances, different types of physical computer instances, different types of storage instances (including, for example, database instances), or a combination thereof.

The client devices 180A-180N may be coupled to the provider network 100 via one or more networks 190. Each of the client devices 180A-180N may represent one or more clients of the provider network 100 and/or configuration recommendation service 110. A client may represent a customer (e.g., an individual or group) of the provider network 100. Clients associated with (e.g., managing and/or operating) the client devices 180A-180N may provide an application to be executed using the computing resources 140. In one embodiment, clients may represent other entities within the provider network 100. Using the techniques described herein, the configuration recommendation service 110 may determine a recommended configuration 115 among the computing resources 140 to execute an application provided by a client. The configuration recommendation service 110 may recommend a configuration for a new and undeployed application, an application that is already deployed in the provider network, or an application that has been deployed in an external environment.

In one embodiment, the configuration recommendation service 110 may include a functionality for configuration analysis 120. The configuration analysis 120 may use, as input, an application description 111 and a set of potential configurations 113. Each of the potential configurations 113 may describe one or more types of the computing resources 140 available in the provider network 100 and, for each of the types of resources, a number (e.g., a defined quantity) of the resources to be used in the configuration. In one embodiment, the configuration analysis 120 may also refer to a set of resource metadata 130. The resource metadata 130 may describe, for example, performance characteristics, cost characteristics, and availability characteristics for types of the resources 140. The configuration analysis 120 may perform automatic (e.g., without needing user input beyond an initial configuration stage) and/or programmatic (e.g., according to execution of program instructions) analysis of applications and configurations to select recommended configurations for the applications. A recommended configuration 115 may describe one or more types of the computing resources 140 available in the provider network 100 and, for each of the types of resources, a number (e.g., a defined quantity) of the resources to be used in the configuration. In one embodiment, the configuration recommendation service 110 or another component of the provider network 100 may select and provision computing resources 140A-140N of the type and number described in the recommended configuration. The configuration recommendation service 110 or provider network 100 may then permit the application to be executed using the provisioned resources.

The provider network 100 may include a fleet of computing resources 140A-140N configured to be controlled (at least in part) by clients associated with client devices 180A-180N, e.g., to execute applications on behalf of clients. The resources 140A-140N may also be referred to as instances or servers. The resources may be implemented using the example computing device 3000 illustrated in FIG. 7. In one embodiment, the fleet of servers 140A-140N may grow or shrink as individual servers are provisioned or deprovisioned, e.g., using resources of the provider network 110. In one embodiment, the fleet of servers 140A-140N may grow or shrink as individual servers are added to or removed from a dedicated fleet by an administrator.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 7), needed to implement and distribute the infrastructure and services offered by the provider network 100. In some embodiments, provider network 100 may provide computing resources, such as configuration recommendation service 110 and computing resources 140A-140N; storage services, such as a block-based storage service, key-value based data stores or various types of database systems; and/or any other type of network-based services. Client devices 180A-180N may access these various services offered by provider network 100 via network(s) 190. Likewise, network-based services may themselves communicate and/or make use of one another to provide different services. For example, computing resources 140 offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

In some embodiments, at least some of the computing resources 140 may be implemented using virtual compute instances and/or physical compute instances. The virtual compute instances and/or physical compute instances may be offered to clients, provisioned, and maintained by a provider network 100 that manages computational resources, memory resources, storage resources, and network resources. A virtual compute instance may comprise one or more servers with a specified computational capacity (which may be specified by indicating the type and number of CPUs, the main memory size, and so on) and a specified software stack (e.g., a particular version of an operating system, which may in turn run on top of a hypervisor). One or more virtual compute instances may be implemented using virtualization techniques with physical computing hardware such as the example computing device 3000 illustrated in FIG. 7. In one embodiment, a suitable component of the provider network 100 may select and/or provision virtual compute instances on behalf of clients. For example, the virtual compute instances may be provisioned from a suitable pool of available computing resources. In one embodiment, additional compute instances may be added to the provider network 100 as needed. In one embodiment, the computing resources used to implement a compute instance may be returned to the pool of available computing resources if the compute instance is not needed at a particular point in time.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 7.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. In one embodiment, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 7:
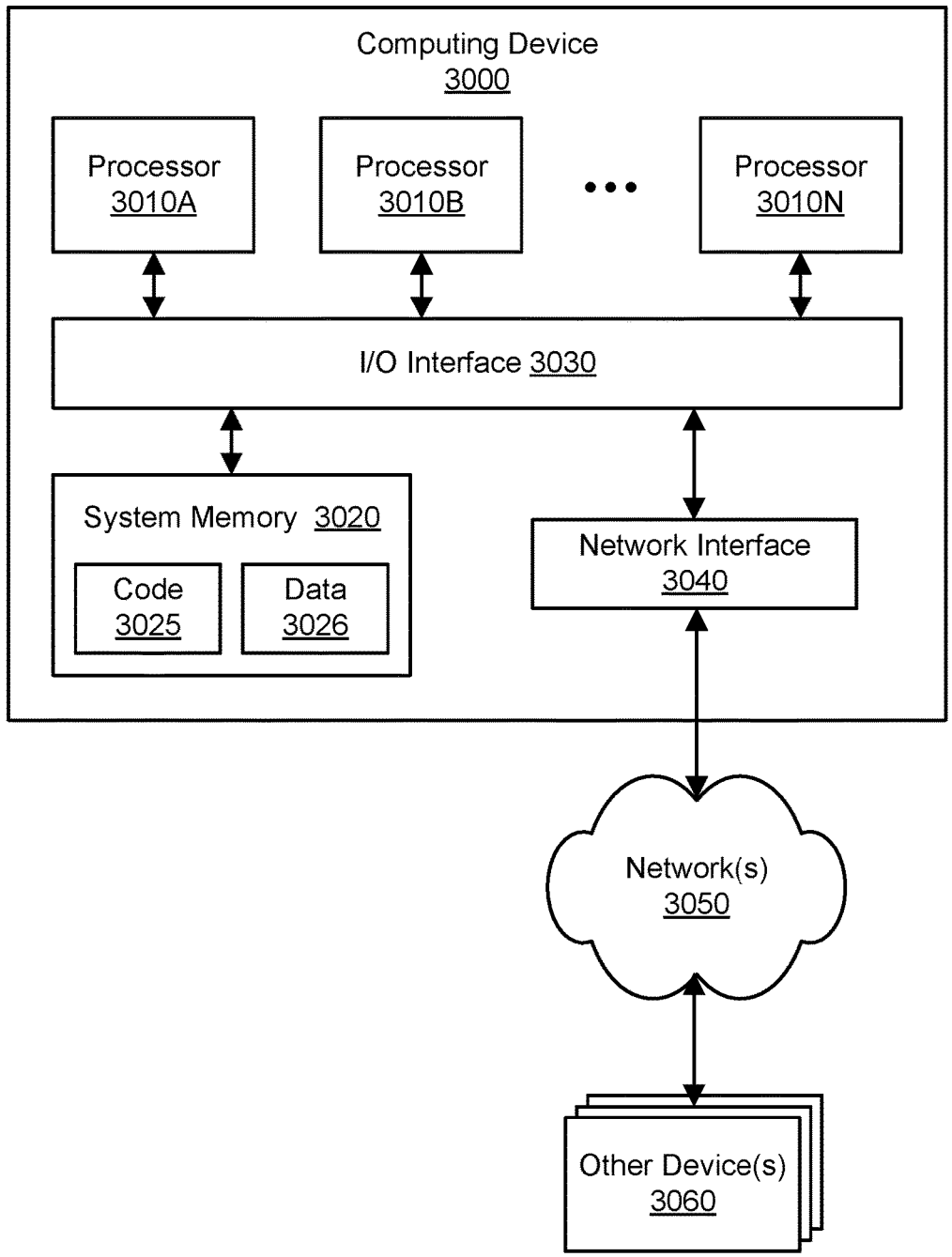
FIG. 7 illustrates an example computing device that may be used in some embodiments.

The provider network 100 may include a plurality of computing devices, any of which may be implemented by the example computing device 3000 illustrated in FIG. 7. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the configuration recommendation service 110 and its constituent functionality 120) may represent any combination of software and hardware usable to perform their respective functions.

It is contemplated that the provider network 100 may include additional components not shown, fewer components than shown, or different combinations, configurations, or quantities of the components shown. For example, although computing resources 140A and 140B through 140N are shown for purposes of example and illustration, it is contemplated that different quantities and configurations of computing resources may be used. Additionally, although three client devices 180A, 180B, and 180N are shown for purposes of example and illustration, it is contemplated that different quantities and configurations of client devices may be used. Aspects of the functionality described herein may be performed, at least in part, by components outside of the provider network 100.

Figure 2A:
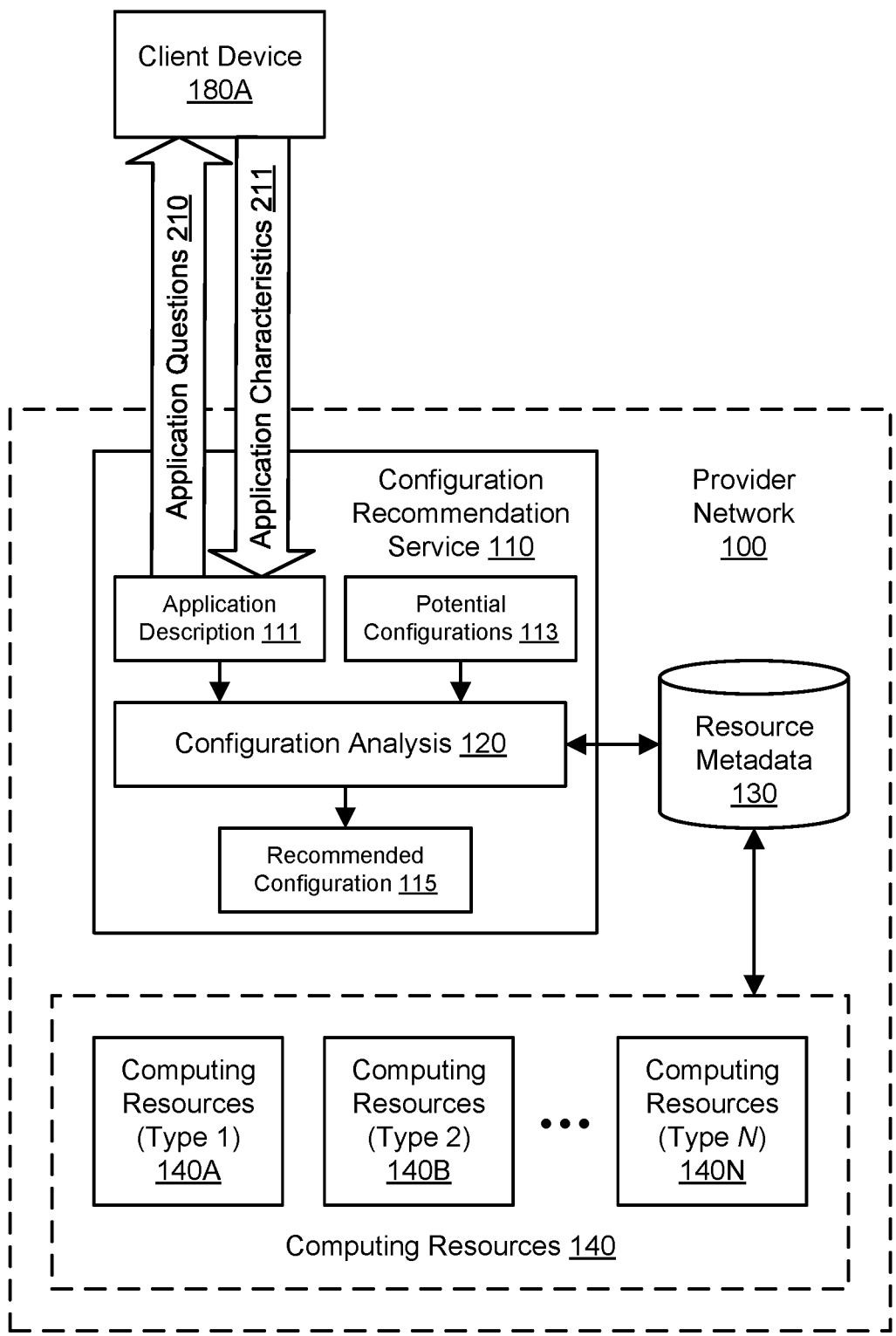
FIG. 2A and FIG. 2B illustrate further aspects of the example system environment for optimizing application configurations in a provider network, including sources of input data for determining an application description, according to one embodiment.

FIG. 2A illustrates further aspects of the example system environment for optimizing application configurations in a provider network, including user input for determining an application description, according to one embodiment. The application description 111 may include data representing one or more resource utilization or usage characteristics of an application. The resource utilization characteristics may include computational characteristics. The resource usage characteristics may relate to anticipated or estimated processor usage, memory usage, storage usage, network usage, and so on.

In various embodiments, the application description 111 or its constituent elements may be determined in various ways. In one embodiment, the resource usage characteristics for the application description 111 may be determined based (at least in part) on input from a user as received from a client device 180A associated with that user. For example, questions 210 (also referred to as application questions) regarding the resource usage characteristics may be presented in a user interface to a client associated with the application, and answers 211 to the questions (representing or describing the resource usage characteristics) may be solicited in the user interface. The answers 211 may represent application characteristics. The questions 210 may ask the client to characterize a workload associated with the application. For example, the questions 210 may ask the client to characterize the anticipated computational intensity of the application (e.g., targeted usage or continuous usage), any requirements for processor usage, any anticipated requirements for memory usage, any anticipated requirements for storage subsystem usage, any anticipated requirements for network usage, and so on. Any suitable user interface elements, such as multiple-choice questions using radio buttons or drop-down menus, may be used to solicit the application characteristics 211. The client may also be asked to define goals or priorities for the application deployment, including the relative priorities of cost and performance.

Figure 2B:
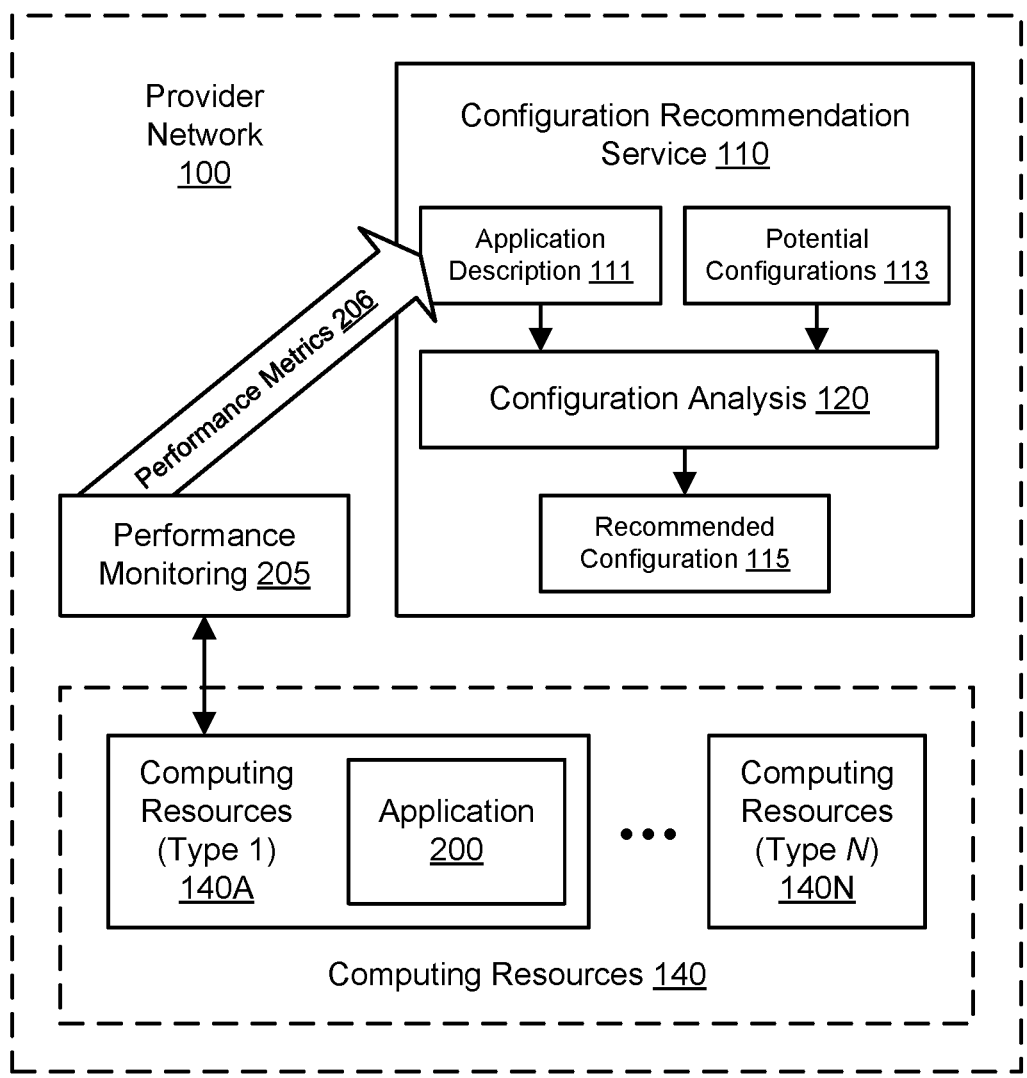

FIG. 2B illustrates further aspects of the example system environment for optimizing application configurations in a provider network, including performance metrics for determining an application description, according to one embodiment. In one embodiment, the resource usage characteristics for the application description 111 may be determined based (at least in part) on performance monitoring 205 of an existing deployment of the application 200 in the provider network 100. For example, as shown in FIG. 2B, the application 200 may be deployed and executed using computing resources 140A of a particular type (e.g., an instance type for virtual compute instances). The application 200 may be deployed with the resources 140A prior to the generation of the recommended configuration 115. The performance monitoring 205 may monitor the execution of the application 200 with the resources 140A to generate suitable performance metrics 206 that characterize the execution. The metrics 206 may include one or more processor metrics, one or more memory metrics, and one or more network metrics. The performance metrics 206 may be used by the configuration recommendation service 110 to generate the resource usage characteristics for the application description 111. In one embodiment, the user input 211 may be solicited and used in combination with the performance metrics 206. However, it is also contemplated that either the user input 211 or the performance metrics 206 (but not both) may be used to determine the application description 111.

In one embodiment, the performance metrics 206 may be computed for each unit of time (e.g., one hour) for each instance and potentially aggregated for a fleet of the same instance type or for a client account. The performance metrics 206 may include a timestamp indicating a window of time that they represent. The performance metrics 206 may indicate a type of use, e.g., targeted use or continuous use for an instance. The performance metrics 206 may include central processing unit (CPU) metrics per unit of time such as the average CPU usage, the maximum CPU usage, the minimum CPU usage, the standard deviation of CPU usage, the length of sustained CPU usage (e.g., usage greater than 60% for at least five minutes), the length of idle CPU usage (e.g., usage less than 5% for at least five minutes), and/or the length of heavy CPU usage (e.g., usage greater than 90% for at least five minutes). The performance metrics 206 may include normalized CPU metrics per unit of time such as the average normalized CPU usage, the maximum normalized CPU usage, the minimum normalized CPU usage, the standard deviation of normalized CPU usage, the length of sustained normalized CPU usage (e.g., usage greater than 60% for at least five minutes), the length of idle normalized CPU usage (e.g., usage less than 5% for at least five minutes), and/or the length of heavy CPU usage (e.g., usage greater than 90% for at least five minutes).

The performance metrics 206 may include network input metrics per unit of time such as the average network input bytes per second, the maximum network input bytes per second, the minimum network input bytes per second, the standard deviation of network input bytes per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes). The performance metrics 206 may include network output metrics per unit of time such as the average network output bytes per second, the maximum network output bytes per second, the minimum network output bytes per second, the standard deviation of network output bytes per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes).

The performance metrics 206 may include metrics for disk read operations per unit of time such as the average disk read operations per second, the maximum disk read operations per second, the minimum disk read operations per second, the standard deviation of disk read operations per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes). The performance metrics 206 may include metrics for disk write operations per unit of time such as the average disk write operations per second, the maximum disk write operations per second, the minimum disk write operations per second, the standard deviation of disk write operations per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes).

The performance metrics 206 may include metrics for disk read bytes per unit of time such as the average disk read bytes per second, the maximum disk read bytes per second, the minimum disk read bytes per second, the standard deviation of disk read bytes per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes). The performance metrics 206 may include metrics for disk write bytes per unit of time such as the average disk write bytes per second, the maximum disk write bytes per second, the minimum disk write bytes per second, the standard deviation of disk write bytes per second, the length of sustained usage (e.g., usage greater than 60% for at least five minutes), the length of idle usage (e.g., usage less than 5% for at least five minutes), and/or the length of heavy usage (e.g., usage greater than 90% for at least five minutes). The performance metrics 206 may also include the total number of workloads per hour, per day, and/or per account.

Figure 3:
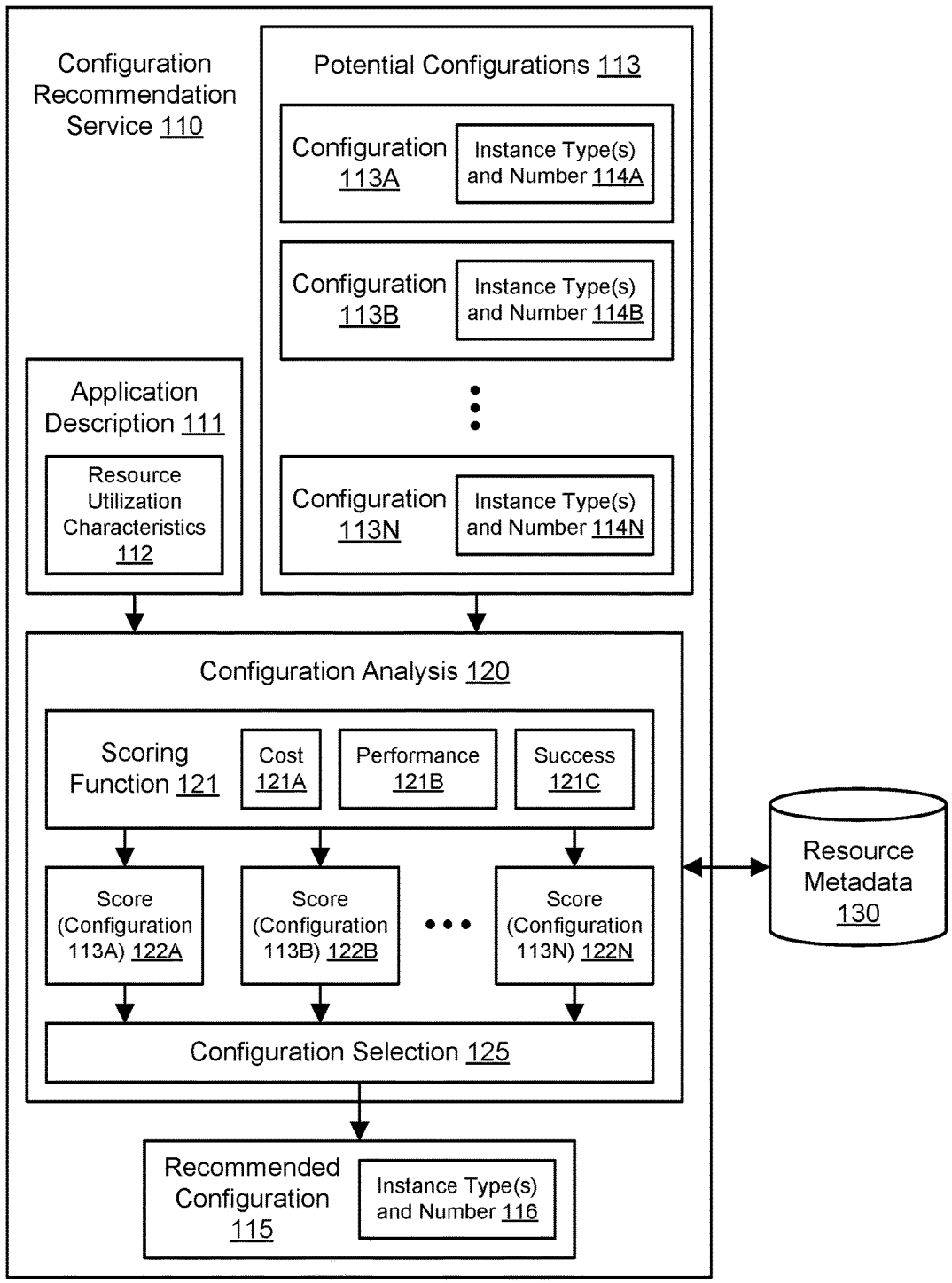
FIG. 3 illustrates further aspects of the example system environment for optimizing application configurations in a provider network, including the scoring of potential configurations using a scoring function, according to one embodiment.

FIG. 3 illustrates further aspects of the example system environment for optimizing application configurations in a provider network, including the scoring of potential configurations using a scoring function, according to one embodiment. The configuration analysis 120 may include automated analysis that is performed automatically (e.g., without the need for user input after an initialization or configuration stage) and/or programmatically (e.g., by execution of program instructions). The automated analysis may be based on machine learning techniques. The automated analysis may be performed based (at least in part) on the application description 111 that includes resource utilization characteristics 112. The automated analysis may be performed of a plurality of potential configurations 113 for an application. Each of the potential configurations 113 may represent a type and number of computing resources in the provider network. The computing resources may include virtual compute instances of various instance types, physical compute instances of various instance types, storage instances for various types of storage subsystems (e.g., block storage instances and database instances), and so on. As shown in the example of FIG. 3, the potential configurations 113 may include configurations 113A and 113B through 113N. Each of the configurations 113A-113N may include a description of one or more instance types of resources in the provider network and, for each instance type, a number (a defined quantity) of such instances. As shown in the example of FIG. 3, the configuration 113A may include instance type(s) and number(s) 114A, the configuration 113B may include instance type(s) and number(s) 114B, and the configuration 113N may include instance type(s) and number(s) 114N.

The automated analysis may include scoring at least a portion of the potential configurations 113 using a scoring function 121. The scoring function 121 may determine a score that represents an estimate of the relative quality or fitness of a particular configuration for the particular application, e.g., in light of the resource utilization characteristics 112 of the application. A score may quantify the quality or fitness of a configurations of resources for a particular application based (at least in part) on whether the resources would be underutilized or overutilized by the application. The scores produced by the scoring function 121 may be normalized within a particular range of values such as 0 and 1, e.g., where 0 represent the worst quality or fitness and 1 represents the best quality or fitness. A superior score (e.g., close to 1) may indicate that the resources are not anticipated to be underutilized or overutilized by the application. As shown in the example of FIG. 3, the scoring function 121 may produce a score 122A for the potential configuration 113A, a score 122B for the potential configuration 113B, and a score 122N for the potential configuration 113N. The scoring function 121 may include or be based on multiple terms or elements, such as a cost element 121A (representing the expense of the configuration), a performance element 121B (representing the speed at which a workload is executed or any other suitable performance metrics for the configuration, including instance health metrics), and/or a successful execution element 121C (representing the success or failure of workloads in this configuration). Different weights may be applied to the various elements to represent different priorities for a particular client or application. For example, if the client is more concerned with speed of execution than with cost for a particular application, then the performance term 121B may be given a larger weight than the cost term 121A in the scoring function 121. In one embodiment, the data set for the automated analysis may be initialized by obtaining configurations for existing customers of the provider network 100, scoring those configurations using the scoring function 121, and generating an initial default data set. The data set may then be enhanced with the addition of newly scored configurations based on the automated analysis.

The configuration analysis 120 may also include a functionality for configuration selection 125. In one embodiment, the configuration selection 125 may select one of the potential configurations 113 for the application based (at least in part) on the scores 122A-122N. The selected configuration may be output as the recommended configuration 115 that includes a description 116 of one or more instance types of resources in the provider network and, for each instance type, a number (a defined quantity) of such instances. For example, the recommended configuration 115 may represent or describe a particular instance type of virtual compute instances and a quantity of such instances. In many cases, the potential configuration with the highest or most superior score among candidate configurations may be selected as the recommended configuration 115. The recommended configuration 115 may represent the configuration with the best fitness for the application (in light of the application description 111) from among the potential configurations. The recommended configuration 115 may represent an optimized configuration that is not necessarily an ideal or perfect configuration. As used herein, the term "optimized" generally means "improved" and not necessarily "perfected."

In various embodiments, different approaches or combinations of approaches may be used in the configuration analysis 120. For example, the configuration analysis 120 may include nearest neighbor analysis, linear regression analysis, neural network analysis, multi-arm bandit analysis, other suitable types of analysis, and/or any suitable combination thereof. In the nearest neighbor approach, a set of neighboring configurations may be determined in a space comprising the set of potential configurations 113. The potential configurations 113 may be associated with other applications for the same client and/or other clients. The neighboring configurations may be associated with ones of the other applications that are similar to the current application, e.g., as determined by their resource usage characteristics. Scoring the potential configurations may include generating scores for the neighboring configurations based (at least in part) on the scoring function 121. The recommended configuration 115 may represent a particular one of the neighboring configurations associated with a superior score. In one embodiment, the neighboring configuration with the best score may be selected as the recommended configuration 115.

In the regression model approach, a regression model or neural network may be determined for the set of potential configurations 113; the potential configurations may be associated with other applications for the same client and/or other clients. For each pair of an application description and a configuration, a score may be calculated using the scoring function 121. These application-configuration pairs may be determined for existing customers and existing configurations of the provider network 100. In this manner, a training set may be generated. Using the training set, the automated analysis may attempt to fit either a logistic regression model or a neural network that learns the mapping from the application description and configuration to the scoring function. For a new application whose configuration is sought to be optimized, a suitably large number of configurations may be considered, and the scores for the new configurations may be estimated with the fitted model. The configurations whose scores surpass a predetermined threshold (also referred to as candidate configurations) may be generated as output and then considered as the recommended configuration for the new application. In one embodiment, the candidate configuration with the most superior score (e.g., closest to 1 on a scale of 0 to 1) may be selected as the recommended configuration 115. In one embodiment, the nearest neighbor approach may be used to determine the configurations whose scores are estimated with the regression model or neural network. However, any suitable technique(s) may be used to select the configurations whose scores are estimated with the regression model or neural network.

Figure 4:
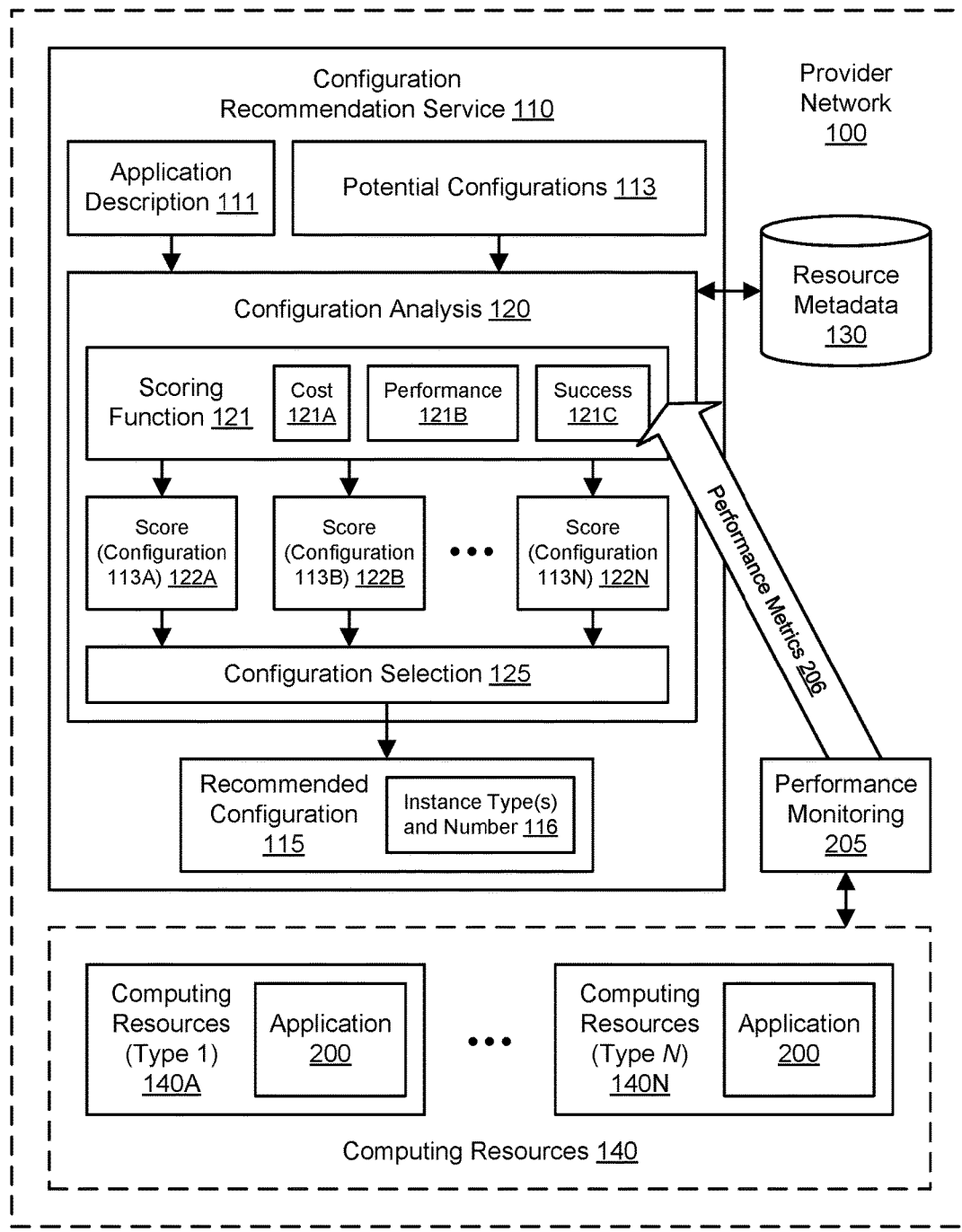
FIG. 4 illustrates further aspects of the example system environment for optimizing application configurations in a provider network, including the scoring of potential configurations for an application based at least in part on performance metrics from a deployment of the application, according to one embodiment.

FIG. 4 illustrates further aspects of the example system environment for optimizing application configurations in a provider network, including the scoring of potential configurations for an application based at least in part on performance metrics from a deployment of the application, according to one embodiment. As discussed above, the configuration analysis 120 may include multi-arm bandit analysis. In the multi-arm bandit approach, the application 200 may be deployed and executed in the multi-tenant provider network 100 using one or more of the potential configurations. In one embodiment, a potential configuration may be scored based (at least in part) on performance monitoring 205 of a deployment of the application 200 in the provider network 100 using the potential configuration. For example, as shown in FIG. 4, the application 200 may be deployed and executed using computing resources 140A of a particular type (e.g., an instance type for virtual compute instances) and may also be deployed and executed using computing resources 140N of another type (e.g., an instance type for virtual compute instances). The application 200 may be deployed with the resources 140A and 140N prior to the generation of the recommended configuration 115.

The performance monitoring 205 may monitor the execution of the application 200 with the resources 140A and 140N to generate suitable performance metrics 206 that characterize the execution. As discussed above with respect to FIG. 2, the metrics 206 may include one or more processor metrics, one or more memory metrics, one or more storage metrics, and one or more network metrics. The performance metrics 206 may be generated for the application 200 in each deployed configuration. The performance metrics 206 may be used by the configuration recommendation service 110 to generate the scores for each of the deployed configurations using the scoring function 121. The performance metrics 206 may inform the performance component 121B and/or success component 121C of the scoring function 121.

In one embodiment, the application 200 may be deployed using one of the potential configurations at a time, and the configuration may be altered from deployment to deployment to determine whether the alteration improves or worsens the fitness score. For example, the instance type of a virtual compute instance or the number of instances may be altered from deployment attempt to deployment attempt, and the configuration may be scored each time. The application 200 may be deployed using potential configurations until the score meets or exceeds a predetermined fitness threshold, until a maximum number of deployment attempts is reached, or until a timeout for performing the automated analysis is reached. A particular one of the deployed configurations associated with a superior score may be selected as the recommended configuration 115.

Figure 5:
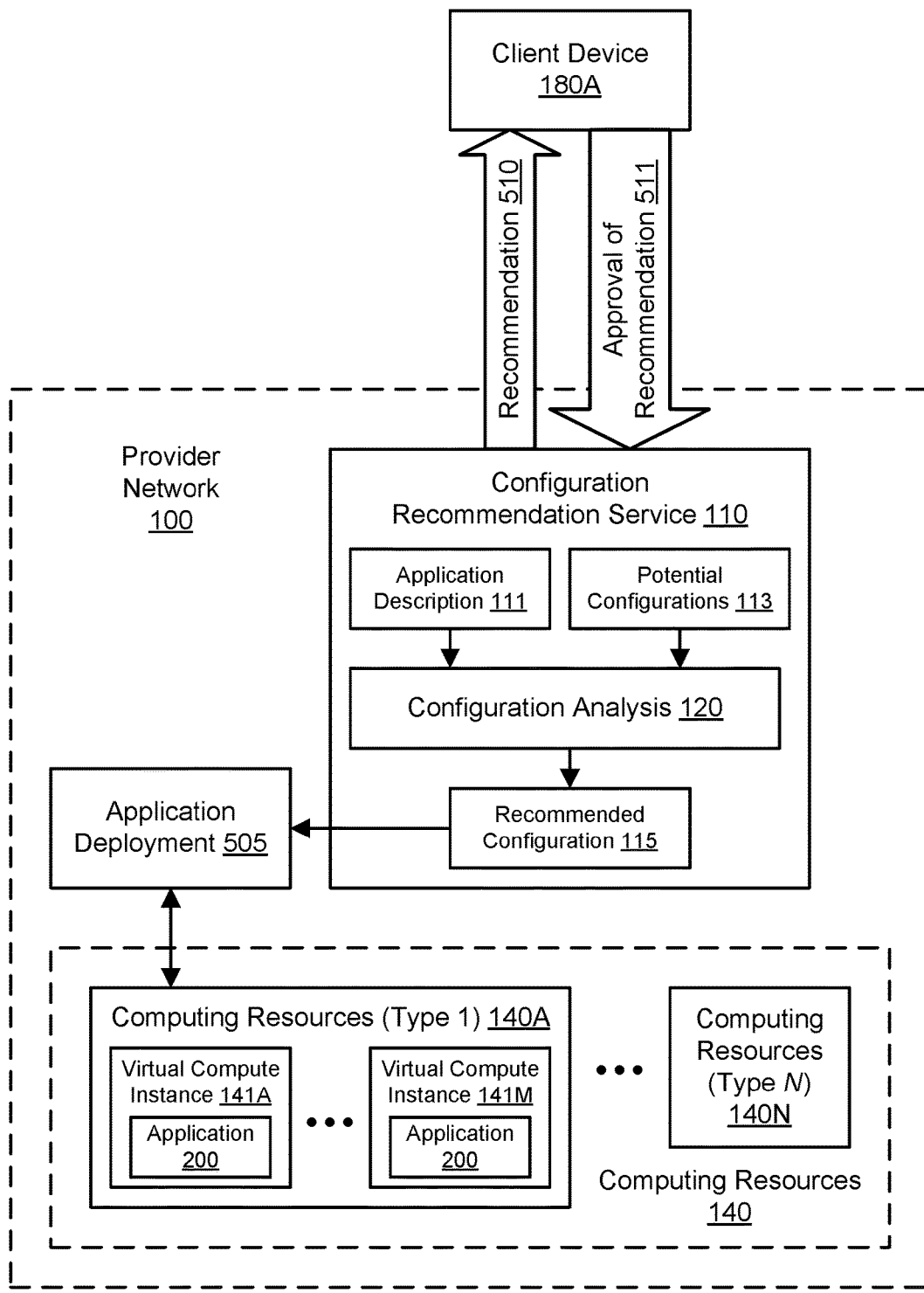
FIG. 5 illustrates further aspects of the example system environment for optimizing application configurations in a provider network, including deploying an application using the type(s) and number of virtual compute instances in a recommended configuration, according to one embodiment.

FIG. 5 illustrates further aspects of the example system environment for optimizing application configurations in a provider network, including deploying an application using the type(s) and number of virtual compute instances in a recommended configuration, according to one embodiment. Approval of the recommended configuration 115 may be sought, e.g., from a client associated with the application 200. In one embodiment, a description of the recommended configuration 115 may be presented or otherwise provided to the client using a graphical user interface and/or programmatic interface, and user input from the client may be solicited to approve or deny the recommended configuration for the application. As shown in the example of FIG. 5, a recommendation 510 based on the recommended configuration 115 may be provided or presented to a client device 180A associated with the client. The client device may respond with approval 511 of the recommendation. In one embodiment, a set of recommended configurations may be provided to the client, and the client may be permitted to select one of them (representing approval of the selected recommendation). In one embodiment, the client may pre-approve the recommended configuration 115, e.g., before the recommended configuration is determined. In one embodiment, additional logic may be automatically applied by the configuration recommendation service 110 or other component of the provider network 100 to approve or deny the recommended configuration 115, e.g., based on cost, availability, and/or other applicable policies.

If the recommendation is approved, then the application 200 may be deployed (and subsequently executed) in the provider network 100 by an application deployment functionality 505 using the type(s) and number of computing resources in the recommended configuration 115. As shown in the example of FIG. 5, the recommended configuration 115 may describe M virtual compute instances of a first instance type. Accordingly, virtual compute instances 141A-141M of the appropriate instance type may be provisioned in the provider network 100, and the client may be given access to those instances such that the application 200 can be executed using the instances. The application deployment functionality 505 of the provider network 100 may provision the instances 141A-141M by reserving the underlying computing hardware from a pool of available resources, installing or initializing appropriate software, and otherwise configuring the instances for use by the client. The first instance type may be associated with a particular level of computational power or functionality, a particular amount of memory, particular local storage resources, a particular class of network adapter, and other such components; other instance types may differ in any of those categories. Different instance types of virtual compute instances may sometimes be described as "larger" or "smaller" in comparison to one another.

In one embodiment, the deployment to the instances 141A-141M may represent a migration from another set of resources (e.g., of a different type) in the provider network 100; the other resources may be deprovisioned and returned to a pool of available resources. In one embodiment, the deployment to the instances 141A-141M may represent an expansion or contraction of the same type of resources in the provider network 100 for an existing deployment of the application 200. Therefore, additional resources of the same type may be provisioned and added to a fleet in which the application 200 is already deployed, or some of the resources in the fleet may be deprovisioned and returned to a pool of available resources.

Prior to execution using the recommended configuration, the application 200 may be provided to the provider network 100 (e.g., to the computing resources provisioned according to the recommended configuration) from any suitable source, including a client device 180A associated with the client. The application 200 may comprise one or more packages, files, or other units of program code. Typically, the application 200 may include a set of program instructions in a binary format, e.g., as compiled for a target platform for the computing resources 141A-141M associated with the recommended configuration. However, the application may also include higher-level portions that are not yet compiled and that the client expects the provider network to compile and execute. The target platform may represent a set of hardware on which the application is intended to be executed, e.g., including one or more particular processors or families of processors. The target platform may also represent a particular operating system or family of operating systems with which the application is intended to be executed. The target platform may be shared among multiple instance types of virtual compute instances.

Figure 6:
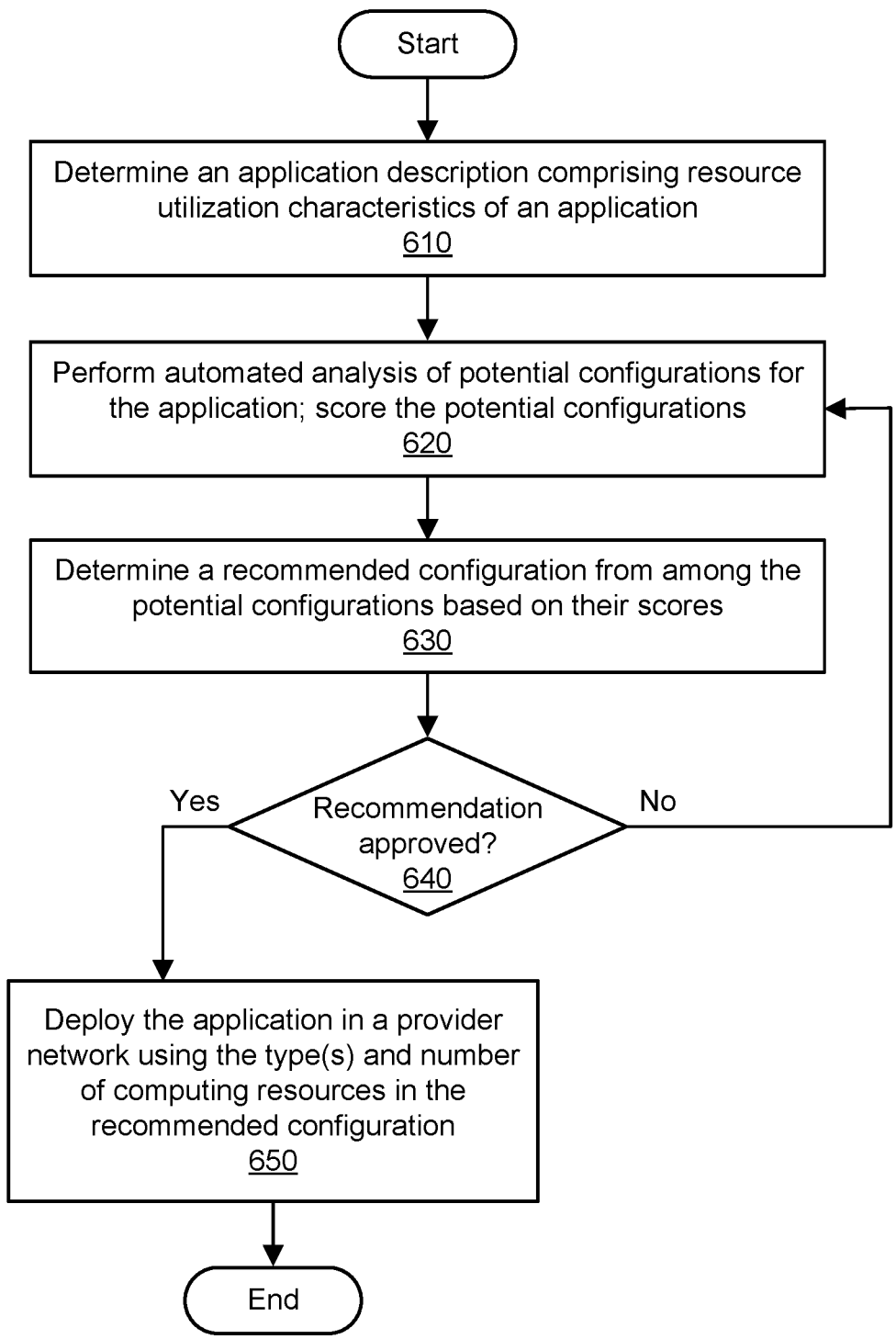
FIG. 6 is a flowchart illustrating a method for optimizing application configurations in a provider network, according to one embodiment.

FIG. 6 is a flowchart illustrating a method for optimizing application configurations in a provider network, according to one embodiment. In one embodiment, the operations shown in FIG. 6 may be performed by a configuration recommendation service and/or by other components of a multi-tenant provider network. As shown below, a configuration recommendation service may recommend a configuration in a provider network for a new and undeployed application, an application that is already deployed in the provider network, or an application that has been deployed in an external environment. The application may be associated with a particular client. The client may represent a customer (e.g., an individual or group) of the multi-tenant provider network that offers access to resources and services, including virtual compute instances on which the client may execute the application.

As shown in 610, an application description may be determined. The application description may include data representing one or more resource utilization characteristics of an application. The resource utilization characteristics may include computational characteristics. The resource usage characteristics may relate to anticipated or estimated processor usage, memory usage, storage usage, network usage, and so on. In one embodiment, the resource usage characteristics may be determined based (at least in part) on input from a user as received from a client device associated with that user. For example, questions regarding the resource usage characteristics may be presented in a user interface to a client associated with the application, and answers to the questions (representing or describing the resource usage characteristics) may be solicited. The questions may ask the client to characterize the anticipated computational intensity of the application, any requirements for processor usage, any anticipated requirements for memory usage, any anticipated requirements for storage subsystem usage, any anticipated requirements for network usage, and so on. In one embodiment, the resource usage characteristics may be determined based (at least in part) on performance monitoring of an existing deployment of the application in the provider network. The performance monitoring may generate suitable performance metrics such as one or more processor metrics, one or more memory metrics, and one or more network metrics that may be used to generate the resource usage characteristics for the application description.

As shown in 620, automated analysis may be performed of a plurality of potential configurations for the application. The automated analysis may be performed based (at least in part) on the application description. The analysis may be performed automatically (e.g., without the need for user input after an initialization or configuration stage) and/or programmatically (e.g., by execution of program instructions). The automated analysis may include scoring at least a portion of the potential configurations using a scoring function. Each of the potential configurations may represent a type and number of computing resources in the provider network. The computing resources may include virtual compute instances of various instance types, physical compute instances of various instance types, storage instances for various types of storage subsystems (e.g., block storage instances and database instances), and so on. The scoring function may determine a score that represents an estimate of the relative quality or fitness of a particular configuration for the particular application, e.g., in light of the resource utilization characteristics of the application. The scores produced by the scoring function may be normalized within a particular range of values such as 0 and 1, e.g., where 0 represent the worst quality or fitness and 1 represents the best quality or fitness. The scoring function may include multiple terms or elements, such as a cost element (representing the expense of the configuration), a performance element (representing the speed at which a workload is executed or any other suitable performance metrics for the configuration), and/or a successful execution element (representing the success or failure of workloads in this configuration). Different weights may be applied to the various elements to represent different priorities for a particular client. For example, if the client is more concerned with speed of execution than with cost, then the performance term may be given a larger weight than the cost term in the scoring function.

In various embodiments, different approaches or combinations of approaches may be used in the automated analysis. For example, the automatic analysis may include nearest neighbor analysis, linear regression analysis, neural network analysis, multi-arm bandit analysis, other suitable types of analysis, and/or any suitable combination thereof. In the nearest neighbor approach, a set of neighboring configurations may be determined in a space comprising the set of potential configurations. The potential configurations may be associated with other applications for the same client and/or other clients. The neighboring configurations may be associated with ones of the other applications that are similar to the current application, e.g., as determined by their resource usage characteristics. Scoring the potential configurations may include generating scores for the neighboring configurations based (at least in part) on the scoring function. The recommended configuration may represent a particular one of the neighboring configurations associated with a superior score. In one embodiment, the neighboring configuration with the best score may be selected as the recommended configuration.

In the regression model approach, a regression model may be determined for the set of potential configurations; the potential configurations may be associated with other applications for the same client and/or other clients. The potential configurations may be scored using the scoring function, and a logit model may be determined using those scores. For a new application whose deployment is sought to be optimized, the model may be used to output a set of candidate configurations, and the one with the most superior score may be selected as the recommended configuration. In the neural network approach, a neural network may be trained using the set of potential configurations; the potential configurations may be associated with other applications for the same client and/or other clients. For a new application whose deployment is sought to be optimized, the neural network may be used to output a set of candidate configurations, and the one with the most superior score may be selected as the recommended configuration.

In the multi-arm bandit approach, the application may be deployed and executed in the multi-tenant provider network using one or more of the potential configurations. Performance metrics may be generated for the application in each deployed configuration, and the configuration may be scored based (at least in part) on the scoring function and on the performance metrics. In one embodiment, the application may be deployed using one of the potential configurations at a time, and the configuration may be altered from deployment to deployment to determine whether the alteration improves or worsens the fitness score. For example, the instance type of a virtual compute instance or the number of instances may be altered from deployment attempt to deployment attempt, and the configuration may be scored each time. The application may be deployed using potential configurations until the score meets or exceeds a predetermined fitness threshold, until a maximum number of deployment attempts is reached, or until a timeout for performing the automated analysis is reached. A particular one of the deployed configurations associated with a superior score may be selected as the recommended configuration.

As shown in 630, a recommended configuration for the application may be determined based (at least in part) on the automated analysis. The recommended configuration may include a type and number of computing resources in the multi-tenant provider network. For example, the recommended configuration may represent or describe a particular instance type of virtual compute instances and a defined quantity of such instances. In one embodiment, the recommended configuration may be selected from the potential configuration based (at least in part) on its score relative to the scores of the other potential configurations. In many cases, the potential configuration with the highest or most superior score among candidate configurations may be selected as the recommended configuration. The recommended configuration may represent the configuration with the best fitness for the application from among the potential configurations. The recommended configuration may represent an optimized configuration but not necessarily an ideal or perfect configuration. As used herein, the term "optimized" generally means "improved" and not necessarily "perfected."

Approval of the recommended configuration may be sought, e.g., from a client associated with the application. In one embodiment, a description of the recommended configuration may be presented or otherwise provided to the client using a graphical user interface and/or programmatic interface, and user input from the client may be solicited to approve or deny the recommended configuration for the application. In one embodiment, the client may pre-approve the recommended configuration, e.g., before the recommended configuration is determined. In one embodiment, additional logic may be automatically applied by the configuration recommendation service or other component of the provider network to approve or deny the recommended configuration, e.g., based on cost, availability, and/or other applicable policies. Accordingly, as shown in 640, it may be determined whether the recommendation is approved.

If the recommendation is not approved, then the method may return to the operation shown in 620 to refine the analysis and generate another recommendation. In one embodiment, machine learning techniques may be used to adapt the analysis based on aspects of the rejected recommendation. If the recommendation is approved, then as shown in 650, the application may be deployed (and subsequently executed) in the provider network using the type(s) and number of computing resources in the recommended configuration. For example, if the recommended configuration describes ten virtual compute instances of a particular instance class, then ten virtual compute instances of that particular instance class may be provisioned in the provider network, and the application may be deployed to those ten instances. In one embodiment, the deployment shown in 650 may represent a migration from another set of resources (e.g., of a different type) in the provider network; the other resources may be deprovisioned and returned to a pool of available resources. In one embodiment, the deployment shown in 650 may represent an expansion or contraction of the same type of resources in the provider network for an existing deployment of the application. Therefore, additional resources of the same type may be provisioned and added to a fleet in which the application is already deployed, or some of the resources in the fleet may be deprovisioned and returned to a pool of available resources.

Illustrative Computer System

In at least some embodiments, a computer system that implements a portion or all of one or more of the technologies described herein may include a computer system that includes or is configured to access one or more computer-readable media. FIG. 7 illustrates such a computing device 3000. In the illustrated embodiment, computing device 3000 includes one or more processors 3010A-3010N coupled to a system memory 3020 via an input/output (I/O) interface 3030. Computing device 3000 further includes a network interface 3040 coupled to I/O interface 3030.

In various embodiments, computing device 3000 may be a uniprocessor system including one processor or a multiprocessor system including several processors 3010A-3010N (e.g., two, four, eight, or another suitable number). Processors 3010A-3010N may include any suitable processors capable of executing instructions. For example, in various embodiments, processors 3010A-3010N may be processors implementing any of a variety of instruction set architectures (ISAs), such as the x86, PowerPC, SPARC, or MIPS ISAs, or any other suitable ISA. In multiprocessor systems, each of processors 3010A-3010N may commonly, but not necessarily, implement the same ISA.

System memory 3020 may be configured to store program instructions and data accessible by processor(s) 3010A-3010N. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processors 3010A-3010N, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processors 3010A-3010N.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a plurality of computing resources in a multi-tenant provider network, wherein the computing resources include a plurality of virtual compute instances, and wherein the plurality of virtual compute instances correspond to a plurality of instance types; and
    one or more computing devices comprising one or more processors and memory and configured to implement a configuration recommendation service, wherein the configuration recommendation service is configured to:
        determine an application description for execution of an application, wherein the application description comprises one or more computational characteristics of the execution of the application;
        perform automated analysis of a plurality of potential configurations of the computing resources for the execution of the application based at least in part on the application description, wherein the automated analysis comprises scoring at least a portion of the potential configurations of the computing resources for the execution of the application based at least in part on a scoring function;
        determine a recommended configuration of the computing resources for the execution of the application based at least in part on the automated analysis of the plurality of potential configurations of the computing resources for the execution of the application, wherein the recommended configuration comprises a type and number of the computing resources in the multi-tenant provider network, including an instance type and number of the virtual compute instances; and
        deploy and execute the application in the multi-tenant provider network using the recommended configuration based at least in part on acceptance of the recommended configuration by a client associated with the application.

2. The system as recited in claim 1, wherein, in performing the automated analysis of the plurality of potential configurations for the application, the configuration recommendation service is configured to:

determine a plurality of neighboring configurations in a space comprising the plurality of potential configurations, wherein the plurality of potential configurations are associated with a plurality of other applications and a plurality of clients, wherein the neighboring configurations are associated with ones of the other applications that are similar to the application, and wherein scoring at least the portion of the potential configurations comprises generating scores for the neighboring configurations based at least in part on the scoring function; and wherein the recommended configuration represents a particular one of the neighboring configurations associated with a superior score.

3. The system as recited in claim 1, wherein, in performing the automated analysis of the plurality of potential configurations for the application, the configuration recommendation service is configured to:

determine a regression model or train a neural network for the plurality of potential configurations, wherein the plurality of potential configurations are associated with a plurality of other applications and a plurality of clients.

4. The system as recited in claim 1, wherein, in performing the automated analysis of the plurality of potential configurations for the application, the configuration recommendation service is configured to:

execute the application in the multi-tenant provider network using one or more deployed configurations of the potential configurations; and generate performance metrics for the application based at least in part on the executing, wherein scoring at least the portion of the potential configurations comprises generating scores for the deployed configurations based at least in part on the scoring function and on the performance metrics; and wherein the recommended configuration represents a particular one of the deployed configurations associated with a superior score.

5. A computer-implemented method, comprising:

performing, by one or more computing devices that collectively implement a configuration recommendation service:

determining an application description for execution of an application, wherein the application description comprises one or more resource utilization characteristics of the execution of the application;

performing automated analysis of a plurality of potential configurations of the computing resources for the execution of the application based at least in part on the application description, wherein the automated analysis comprises scoring at least a portion of the potential configurations of the computing resources for the execution of the application based at least in part on a scoring function; and determining a recommended configuration of the computing resources for the execution of the application based at least in part on the automated analysis of the plurality of potential configurations of the computing resources for the execution of the application, wherein the recommended configuration comprises a type and number of computing resources in a multi-tenant provider network.

6. The method as recited in claim 5, wherein the computing resources include a plurality of virtual compute instances, wherein the plurality of virtual compute instances correspond to a plurality of instance types, and wherein the recommended configuration comprises an instance type and number of the virtual compute instances.

7. The method as recited in claim 5, wherein the computing resources include a plurality of storage instances, wherein the plurality of storage instances correspond to a plurality of instance types, and wherein the recommended configuration comprises an instance type and number of the storage instances.

8. The method as recited in claim 5, further comprising:

deploying and executing the application in the multi-tenant provider network using the recommended configuration based at least in part on acceptance of the recommended configuration by a client associated with the application.

9. The method as recited in claim 5, wherein the scoring function comprises a cost element, a performance element, and a successful execution element.

10. The method as recited in claim 5, wherein performing the automated analysis of the plurality of potential configurations for the application comprises:

determining a plurality of neighboring configurations in a space comprising the plurality of potential configurations, wherein the plurality of potential configurations are associated with a plurality of other applications and a plurality of clients, wherein the neighboring configurations are associated with ones of the other applications that are similar to the application, and wherein scoring at least the portion of the potential configurations comprises generating scores for the neighboring configurations based at least in part on the scoring function; and wherein the recommended configuration represents a particular one of the neighboring configurations associated with a superior score.

11. The method as recited in claim 5, wherein performing the automated analysis of the plurality of potential configurations for the application comprises:

determining a regression model or training a neural network for the plurality of potential configurations, wherein the plurality of potential configurations are associated with a plurality of other applications and a plurality of clients.

12. The method as recited in claim 5, wherein performing the automated analysis of the plurality of potential configurations for the application comprises:

executing the application in the multi-tenant provider network using one or more deployed configurations of the potential configurations; and generating performance metrics for the application based at least in part on the executing, wherein scoring at least the portion of the potential configurations comprises generating scores for the deployed configurations based at least in part on the scoring function and on the performance metrics; and wherein the recommended configuration represents a particular one of the deployed configurations associated with a superior score.

13. The method as recited in claim 5, wherein determining the application description comprises:

receiving, from a client associated with the application, user input comprising a description of the one or more resource utilization characteristics of the application.

14. The method as recited in claim 5, wherein determining the application description comprises:

executing the application in the multi-tenant provider network;

generating performance metrics for the application based at least in part on the executing, wherein the performance metrics comprise one or more processor metrics, one or more memory metrics, and one or more network metrics; and determining the one or more resource utilization characteristics of the application based at least in part on the performance metrics, wherein the resource utilization characteristics comprise one or more processor usage characteristics, one or more memory usage characteristics, and one or more network usage characteristics.

15. A non-transitory computer-readable storage medium storing program instructions computer-executable to perform:

determining an application description for execution of an application, wherein the application description comprises one or more resource utilization characteristics of the execution of the application associated with a client of a multi-tenant provider network, wherein the multi-tenant provider network comprises a plurality of computing resources of differing types;

performing automated analysis of a plurality of potential configurations of the computing resources for the execution of the application based at least in part on the application description, wherein the automated analysis comprises scoring at least a portion of the potential configurations of the computing resources for the execution of the application based at least in part on a scoring function;

determining a recommended configuration of the computing resources for the execution of the application based at least in part on the automated analysis of the plurality of potential configurations of the computing resources for the execution of the application, wherein the recommended configuration comprises a type and number of computing resources in the multi-tenant provider network; and providing the recommended configuration to the client.

16. The non-transitory computer-readable storage medium as recited in claim 15, wherein the program instructions are further computer-executable to perform:

deploying and executing the application in the multi-tenant provider network using the recommended configuration based at least in part on acceptance of the recommended configuration by a client associated with the application.

17. The non-transitory computer-readable storage medium as recited in claim 15, wherein performing the automated analysis of the plurality of potential configurations for the application comprises:

determining a plurality of neighboring configurations in a space comprising the plurality of potential configurations, wherein the plurality of potential configurations are associated with a plurality of other applications and a plurality of clients, wherein the neighboring configurations are associated with ones of the other applications that are similar to the application, and wherein scoring at least the portion of the potential configurations comprises generating scores for the neighboring configurations based at least in part on the scoring function; and wherein the recommended configuration represents a particular one of the neighboring configurations associated with a superior score.

18. The non-transitory computer-readable storage medium as recited in claim 15, wherein performing the automated analysis of the plurality of potential configurations for the application comprises:

determining a regression model or training a neural network for the plurality of potential configurations, wherein the plurality of potential configurations are associated with a plurality of other applications and a plurality of clients.

19. The non-transitory computer-readable storage medium as recited in claim 15, wherein performing the automated analysis of the plurality of potential configurations for the application comprises:

executing the application in the multi-tenant provider network using one or more deployed configurations of the potential configurations; and generating performance metrics for the application based at least in part on the executing, wherein scoring at least the portion of the potential configurations comprises generating scores for the deployed configurations based at least in part on the scoring function and on the performance metrics; and wherein the recommended configuration represents a particular one of the deployed configurations associated with a superior score.

20. The non-transitory computer-readable storage medium as recited in claim 15, wherein determining the application description comprises:

executing the application in the multi-tenant provider network;

generating performance metrics for the application based at least in part on the executing, wherein the performance metrics comprise one or more processor metrics, one or more memory metrics, and one or more network metrics; and determining the one or more resource utilization characteristics of the application based at least in part on the performance metrics, wherein the resource utilization characteristics comprise one or more processor usage characteristics, one or more memory usage characteristics, and one or more network usage characteristics.

* * * * *